(12) United States Patent
Low

(10) Patent No.: US 11,863,055 B2
(45) Date of Patent: *Jan. 2, 2024

(54) POWER CONVERTERS WITH INTEGRATED BIDIRECTIONAL STARTUP

(71) Applicant: pSemi Corporation, San Diego, CA (US)

(72) Inventor: Aichen Low, Cambridge, MA (US)

(73) Assignee: pSemi Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,173

(22) Filed: Dec. 29, 2022

(65) Prior Publication Data

US 2023/0216393 A1 Jul. 6, 2023

Related U.S. Application Data

(63) Continuation of application No. 16/749,844, filed on Jan. 22, 2020, now Pat. No. 11,552,543.

(51) Int. Cl.
*H02M 1/36* (2007.01)
*H02M 1/00* (2006.01)

(52) U.S. Cl.
CPC ........... *H02M 1/0006* (2021.05); *H02M 1/36* (2013.01)

(58) Field of Classification Search
CPC ............................. H02M 1/36; H02M 1/0006
See application file for complete search history.

(56) References Cited

U.S. PATENT DOCUMENTS

| 7,348,791 | B1 | 3/2008 | Mayder |
| 7,786,712 | B2 | 8/2010 | Williams |

(Continued)

FOREIGN PATENT DOCUMENTS

| EP | 0585788 B1 * | 8/1994 | ............ H02M 1/006 |
| KR | 10-2016-0058704 | 5/2016 | |

(Continued)

OTHER PUBLICATIONS

Parl. Hye Lyun, International Search Report and Written Opinion received from KIPO dated May 6, 2021 for appln. No. PCT/US2021/013515, 11 pgs.

(Continued)

*Primary Examiner* — Peter M Novak
(74) *Attorney, Agent, or Firm* — JAQUEZ LAND GREENHAUS & MCFARLAND LLP; John Land, Esq.

(57) ABSTRACT

Circuits and methods encompassing a power converter that can be started and operated in a reversed unidirectional manner or in a bidirectional manner while providing sufficient voltage for an associated auxiliary circuit and start-up without added external circuitry for a voltage booster and/or a pre-charge circuit—that is, with zero external components or a reduced number of external components. Embodiments include an auxiliary circuit configured to selectively couple the greater of a first or a second voltage from a power converter to provide power to the auxiliary circuit. Embodiments include an auxiliary circuit configured to select a subcircuit coupled to the greater of a first or a second voltage from a power converter to provide an output for the auxiliary circuit. Embodiments include a charge pump including a gate driver configured to be selectively coupled to one of a first voltage node or second voltage node of the charge pump.

10 Claims, 14 Drawing Sheets

(56) References Cited

U.S. PATENT DOCUMENTS

| | | |
|---|---|---|
| 8,222,872 B1 | 7/2012 | Melanson et al. |
| 9,041,379 B2 | 5/2015 | Lyons |
| 11,552,543 B2 | 1/2023 | Low |
| 2010/0327765 A1 | 12/2010 | Melanson et al. |
| 2011/0122662 A1 | 5/2011 | Li et al. |
| 2017/0012539 A1 | 1/2017 | Chen |
| 2019/0013727 A1 | 1/2019 | Ke |
| 2021/0226546 A1 | 7/2021 | Low |

FOREIGN PATENT DOCUMENTS

| | | |
|---|---|---|
| TW | 201703413 | 1/2017 |
| TW | 201907647 | 2/2019 |
| WO | 2014083788 | 6/2014 |
| WO | 2021150428 | 7/2021 |

OTHER PUBLICATIONS

Taiwanese Patent Office, English translation of Office Action received dated Jun. 14, 2022 for appln. No. 11120580090, 8 pgs.
Novak, Peter Michael, Office Action received from the USPTO dated Feb. 4, 2022 for U.S. Appl. No. 16/749,844, 20 pgs.
Novak, Peter Michael, Final Office Action received from the USPTO dated May 17, 2022 for U.S. Appl. No. 16/749,844, 8 pgs.
Novak, Peter Michael, Notice of Allowance received from the USPTO dated Sep. 8, 2022 for U.S. Appl. No. 16/749,844, 9 pgs.

* cited by examiner

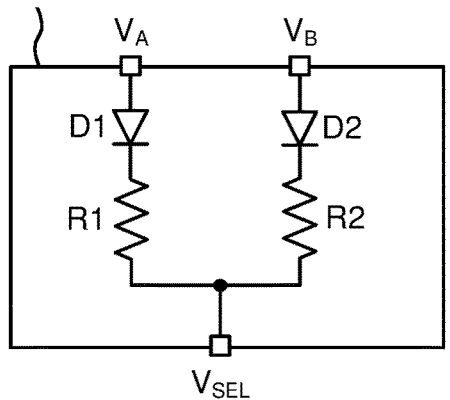
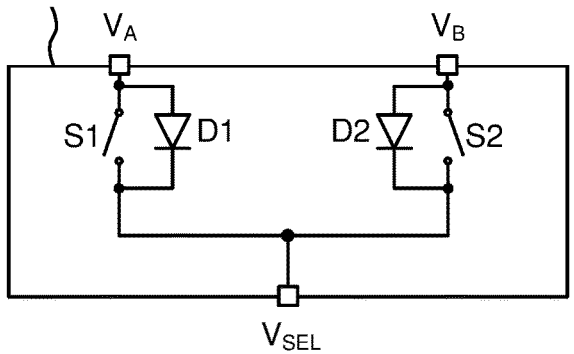
FIG. 4A  FIG. 4B
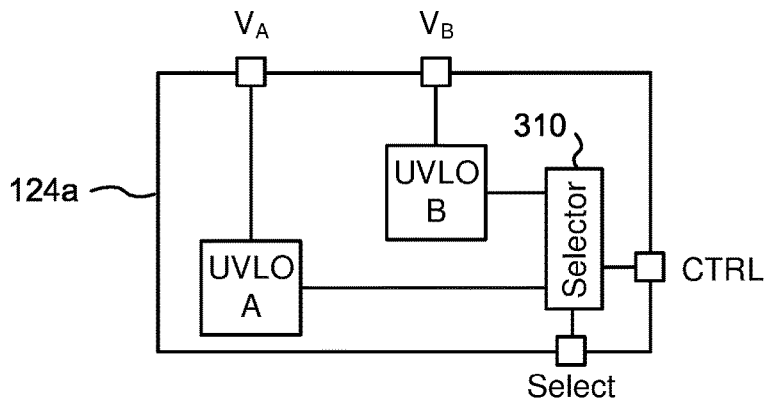
FIG. 5A
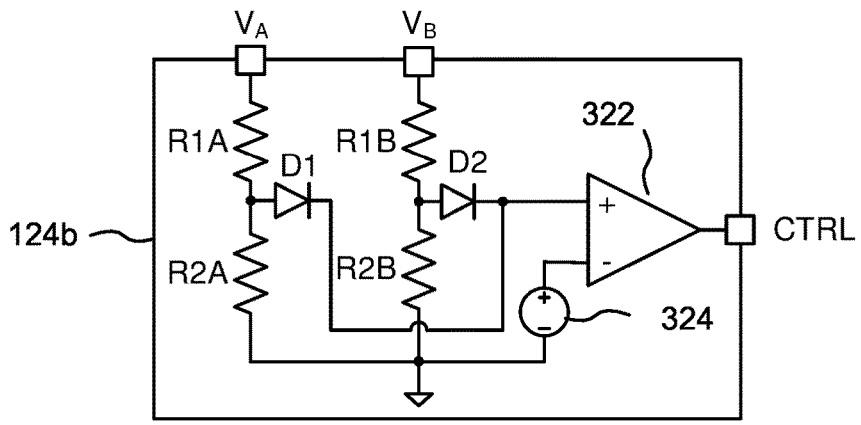
FIG. 5B

1000

For a gate driver circuit of a corresponding transistor switch of a converter circuit of a power converter, selectively coupling a level shifter and gate-drive to one of a first output source potential or a second output source potential, wherein the first output source potential comes from a first voltage node of the converter circuit of the power converter, and the second output source potential comes from a second, different voltage node of the converter circuit of the power converter ⎯ 1002

FIG. 10

POWER CONVERTERS WITH INTEGRATED BIDIRECTIONAL STARTUP

CROSS-REFERENCE TO RELATED APPLICATIONS—CLAIM OF PRIORITY

The present application is a continuation application of co-pending and commonly assigned U.S. application Ser. No. 16/749,844, filed Jan. 22, 2020, for a "Power Converters with Integrated Bidirectional Startup", to issue on Jan. 10, 2023 as U.S. Pat. No. 11,552,543, which is herein incorporated by reference in its entirety.

BACKGROUND

(1) Technical Field

This invention relates to electronic circuits, and more particularly to power converter circuits, including DC-DC power converter circuits, that may benefit from an auxiliary circuit configured to select between first and second voltages.

(2) Background

Many electronic products, particularly mobile computing and/or communication products and components (e.g., notebook computers, ultra-book computers, tablet devices, LCD and LED displays) require multiple voltage levels. For example, radio frequency (RF) transmitter power amplifiers may require relatively high voltages (e.g., 12V or more), whereas logic circuitry may require a low voltage level (e.g., 1-2V). Still other circuitry may require an intermediate voltage level (e.g., 5-10V).

Power converters are often used to generate a lower or higher voltage from a common power source, such as a battery. Power converters include DC-DC or AC-DC converters. One type of power converter comprises a converter circuit, control circuitry, and auxiliary circuitry such as bias voltage generator(s), a clock generator, a voltage regulator, a voltage control circuit, etc. Power converters which generate a lower output voltage level from a higher input voltage power source are commonly known as buck converters, so-called because $V_{OUT}$ is less than $V_{IN}$, and hence the converter is "bucking" the input voltage. Power converters which generate a higher output voltage level from a lower input voltage power source are commonly known as boost converters, because $V_{OUT}$ is greater than $V_{IN}$.

FIG. 1A is a block diagram of a prior art unidirectional power converter 100. A converter circuit 102 having input terminals T1/T1' and output terminals T2/T2' is configured such that input terminals T1/T1' are coupled to a voltage source 104 (e.g., a battery) and output terminals T2/T2' are coupled to an output capacitor $C_{OUT}$ and a load 106. The converter circuit 102 may be, for example, a switched-capacitor network such as a charge pump, or an inductor-based regulator. Examples of charge pumps include cascade multiplier, Dickson, Ladder, Series-Parallel, Fibonacci, and Doubler switched-capacitor networks, all of which may be configured as a multi-phase or a single-phase switched-capacitor network. A power converter 100 based on a charge pump-type converter circuit 102 uses capacitors as the primary energy storage elements to transfer charge from the input to the output of the power converter 100. These charge transfer capacitors are commonly known as "fly capacitors" or "pump capacitors" and may be external components coupled to an integrated circuit embodiment of the power converter 100. In contrast, a power converter 100 using an inductor-based regulator for the converter circuit 102 uses an inductor or transformer as the primary energy storage element instead of capacitors. Examples of inductor-based regulators include well-known buck, boost, buck-boost, resonant, multi-level, Cuk, SEPIC, Forward, and Full-Bridge configurations.

In the illustrated example, the voltage applied across input terminals T1/T1' is $V_{IN}$, and the converted voltage provided across output terminals T2/T2' is $V_{OUT}$. A controller 108 outputs a set of control-signals 112 that control the internal components of the converter circuit 102 (e.g., internal switches, such as low voltage FETs, especially MOSFETs) to cause the converter circuit 102 to either boost or buck $V_{IN}$ to $V_{OUT}$. The controller 108 may also receive a separate set of control signals 112 indicative of the converter circuit 102 operation. An auxiliary circuit 110 may provide various voltages and/or signals to the controller 108 (and optionally directly to the converter circuit 102), such as a voltage $V_{DD}$, a clock signal CLK, a circuit bias voltage $V_{BIAS}$, and one or more control signals CTRL. Power to the illustrated auxiliary circuit 110 is supplied at $V_{INPUT}$ (It should be noted that while this disclosure distinguishes between a power converter 100 and a converter circuit 102, much of the literature labels the entire power converter 100 as a "power converter", or labels the converter circuit 102 as a "charge pump").

Many buck converters and boost converters are designed to be unidirectional, with most or all components of the converter circuit 102, the controller 108, and the auxiliary circuit 110 integrated within a single integrated circuit or circuit module. Accordingly, by design, the circuitry for a unidirectional power converter is powered from its input voltage, $V_{IN}$, since a voltage source 104 (e.g., a battery) is available at the input to provide power to the circuitry. For example, as shown in FIG. 1A, the auxiliary circuit 110 is powered by the voltage $V_{IN}$ provided by the voltage source 104 coupled to the $V_{INPUT}$ terminal of the auxiliary circuit 110 (as well as the input terminal T1 of the converter circuit 102).

FIG. 1B is a block diagram showing one example of an auxiliary circuit 110 for the power converter 100 of FIG. 1A. A voltage $V_{IN}$ from the voltage source 104 is coupled to $V_{INPUT}$ and is applied to a voltage regulator 122 which generates a regulated output voltage $V_{DD}$ (e.g., 1.8V or 3.3V or 4.5V). An under-voltage lockout (UVLO) circuit 124 also couples to $V_{INPUT}$ and prevents operation of the voltage regulator 122 (and thus blocks output of $V_{DD}$) unless $V_{IN}$ exceeds a desired minimum value, $V_{MIN}$. The UVLO circuit 124 may also supply a control signal CTRL to the controller 108 to disable or enable operation of the controller 108 depending on the voltage $V_{IN}$ being less than or at least $V_{MIN}$. The $V_{DD}$ output from the voltage regulator 122 may be coupled to a bias generator 126 which outputs a bias voltage $V_{MAS}$ to the controller 108 (and optionally directly to the converter circuit 102), and to an oscillator 128 which outputs one or more clock signals CLK (e.g., a single phase timing pulse, or two or more timing pulse phases). Generally, low voltage FETs (particularly MOSFETs) would be used in most or all of the subcircuits within the auxiliary circuit 110. In variations, some of the voltages and/or signals (e.g., $V_{DD}$, $V_{BIAS}$, CLK) can be supplied externally from the system if available (thereby eliminating some components of the auxiliary circuit 110), but doing so makes the power converter 100 less self-contained and independent, which runs contrary to the industry trend towards greater integration of electronic circuitry.

At times it may be useful to utilize an existing unidirectional power converter in a reversed configuration, such that the $V_{IN}$ and $V_{OUT}$ voltages are switched relative to the nominal input terminals T1/T1' and output terminals T2/T2' of the converter circuit 102. Thus, for example, it may be useful to repurpose a circuit designed to be a unidirectional buck power converter to instead be a boost power converter, and vice versa, thereby expanding the range of applications for a single circuit design.

Further, unidirectional power converters are not well suited for all applications. For example, a number of electronic applications may require rechargeable battery power, configured such that power may flow from a battery to a load at times, while at other times power is flowing in the reverse direction to recharge the battery. Such applications may include, for example, laptop computers having two separate batteries and electric vehicles. In the example of electric vehicles, an internal combustion engine and/or regenerative braking may provide recharge power to a battery that is otherwise used for powering an electric drive train. Such applications generally require a bidirectional power converter that can be dynamically configured as either a buck or a boost converter, with the mode of operation being selectable by control circuitry; accordingly, at times, the application of voltages $V_{IN}$ and $V_{OUT}$ are effectively swapped at the input and output terminals of the converter circuit 102. (Note that a power converter of the type considered here inherently supports bidirectional power flow once operating at steady-state; it is the initial enable and start-up that define the unidirectional nature of such a power converter).

A problem that arises with power converters operated in a "reversed" configuration or mode is that an adequate voltage does not exist at the effective $V_{OUT}$ terminal until the converter circuit 102 in conjunction with the control circuitry generate an output voltage $V_{OUT}$ from an input voltage $V_{IN}$ applied at the effective input terminals. For example, FIG. 2A shows a block diagram 200 of a reverse-operation configuration of the unidirectional power converter 100 of FIG. 1A in which the voltage source 104' and load 106' are swapped compared to the voltage source 104 and load 106 shown in FIG. 1A. Thus, the converter circuit 102 is configured such that terminals T1/T1' are coupled to an output capacitor $C_{OUT}$ and a load 106' and the terminals T2/T2' are coupled to a voltage source 104', and the labels $V_{OUT}$ and $V_{IN}$ are reversed compared to FIG. 1A. Accordingly, the voltage coupled to $V_{INPUT}$ of the auxiliary circuit 110 is $V_{OUT}$ since $V_{INPUT}$ also couples to the input terminal T1 of converter circuit 102. In the configuration illustrated in FIG. 2A, the voltage $V_{OUT}$ may be zero or too low to power the auxiliary circuit 110 prior to converter circuit 102 operation, all because the auxiliary circuit 110 has insufficient voltage to make the controller 108 operational—a circular startup problem. Only when $V_{OUT}$ meets or exceeds a specified minimum voltage $V_{MIN}$ would the auxiliary circuit 110 become operational and enable operation of the converter circuit 102.

An existing solution to the startup problem is to create a separate voltage supply that supplies the necessary voltage greater than minimum voltage $V_{MIN}$ to power the auxiliary circuit 110 regardless of direction of power conversion; that is, neither $V_{OUT}$ nor $V_{IN}$ from the converter circuit 102 is directly used to power the auxiliary circuit 110. This solution adds system complexity in requiring the presence or addition of a suitable voltage for this purpose. If such a voltage is not already available, then additional circuitry is required to generate this voltage from $V_{IN}$, potentially adding another auxiliary power converter just to enable the main power converter 200. If the power converter 200 is to operate as a buck converter, then the voltage $V_{IN}$ from the voltage source 104' is higher than the voltage $V_{OUT}$ and generating a lower voltage from an available higher voltage source is relatively simple—the additional circuitry can take the form of a low-dropout regulator (LDO) or a resistor divider. However, if the power converter 200 is to operate as a boost converter, then the voltage $V_{IN}$ from the voltage source 104' is lower than the voltage $V_{OUT}$ and generating a higher voltage from an available lower voltage source is more difficult—the additional circuitry will usually take the form of another power converter such as a switched-capacitor network or an inductor-based boost regulator. Inductors are usually much larger in overall size and more expensive than capacitors.

One solution is taught in co-pending U.S. patent application Ser. No. 16/749,785, filed Jan. 22, 2020, entitled "*Reversed-Operation Power Converter Startup Circuit and Method*" (now U.S. Pat. No. 10,958,159, issued Mar. 23, 21), assigned to the assignee of the present invention, the contents of which are incorporated in this application by reference. That solution is to provide a voltage booster coupled between $V_{IN}$ and $V_{OUT}$ and configured to impose a voltage on $V_{OUT}$ until normal power converter operation provides for an adequate $V_{OUT}$ voltage. For example, FIG. 2A shows such a voltage booster 202, which may be, for example, a charge pump circuit. The voltage booster 202 generally would be implemented as an external circuit coupled to the converter circuit 102. Of note, as the conversion ratio for the converter circuit 102 increases, the voltage booster 202 will most likely also need a higher conversion ratio, and the circuit size for a charge pump-based implementation of the voltage booster 202 starts becoming comparable to an inductor-based boost regulator.

If the converter circuit 102 is primarily a step-down power converter, then enabling it for reversed step-up operation (with the input voltage $V_{IN}$ applied to terminals T2, T2', as shown in FIG. 2A) is possible either with a separate voltage supply to the auxiliary circuit 110, or with the inclusion of a voltage booster 202. However, if the converter circuit 102 is primarily a step-up power converter, then enabling it for reversed step-down operation can be simpler since generating a lower voltage at $V_{INPUT}$ of the auxiliary circuit 110 from a higher voltage $V_{IN}$ does not require a voltage booster 202. Instead, a solution comprises a pre-charge circuit 204 that generates one or more voltages levels below the input voltage $V_{IN}$ and which can be coupled to one or more nodes within the converter circuit 102. For example, FIG. 2B is a schematic diagram of one embodiment of the pre-charge circuit 204 of FIG. 2A that couples to one or more nodes within the converter circuit 102 and/or to $V_{INPUT}$ of the auxiliary circuit 110. In the illustrated example, a set of series-connected resistors R1-R5, generally of equal value, provide a resistive divider to generate a fractional voltage $V_X$ and optionally fractional voltages $V_{C1}$-$V_{C4}$ based on the voltage $V_{C5}$ at the top of the resistor divider. The top and bottom nodes $V_{C5}$, $V_{SS}$ of the resistor divider couple to converter circuit 102 terminals T2, T2' respectively, resulting in the voltage $V_{C5}$ being equivalent to the input voltage $V_{IN}$ at terminal T2. The voltage $V_X$ can be coupled to converter circuit 102 terminal T1, which is already coupled to $V_{INPUT}$ of the auxiliary circuit 110. In this manner, the pre-charge circuit 204 can supply the necessary voltage to $V_{INPUT}$ equal to or greater than $V_{MIN}$ in order to enable the controller 108 and the converter circuit 102 in FIG. 2A. The diodes D0-D4 in FIG. 2B can be used to isolate the resistor divider from the voltages at $V_X$ and $V_{C1}$-$V_{C4}$ once converter circuit 102 operation begins. The pre-charge circuit 204 can also be implemented as an external circuit coupled to the converter circuit 102 as needed by replacing diodes D0-D4 with switches. In this manner, pre-charge circuit 204 can be enabled or disabled as needed to support reversed step-down operation of a unidirectional step-up power converter 200.

It would be desirable if a converter circuit 102 could be started and operated in a reversed unidirectional manner or in a bidirectional manner while providing sufficient voltage for the associated auxiliary circuit 110 and without the added external circuitry of a voltage booster 202 or a pre-charge circuit 204—that is, with zero external components. The present invention meets this need and provides additional benefits.

SUMMARY

The present invention encompasses circuits and methods relating to a power converter that can be started and operated in a reversed unidirectional manner or in a bidirectional manner while providing sufficient voltage for an associated auxiliary circuit and start-up without the added external circuitry of a voltage booster and/or a pre-charge circuit—that is, with zero external components for some embodiments, or a reduced number of external components for other embodiments.

Some embodiments include an auxiliary circuit configured to provide various voltages and/or signals to power converter control circuitry and a power converter, the power converter having a first terminal configured to be selectably coupled to a first voltage and a second terminal configured to be selectably coupled to a second voltage, the auxiliary circuit including at least one input voltage selector, configured to be coupled to the first terminal and the second terminal of the power converter and to selectively couple the greater of the first voltage or the second voltage to power the auxiliary circuit.

Some embodiments include an auxiliary circuit configured to provide various voltages and/or signals to other circuitry, the auxiliary circuit including at least a first subcircuit coupled to the first terminal of a power converter and at least a second subcircuit coupled to the second terminal of the power converter, and configured to select the at least one subcircuit coupled to the greater of the first voltage or the second voltage to provide an output for the auxiliary circuit.

A significant benefit of such auxiliary circuit embodiments is that the analog multiplexor and/or subcircuit selection circuitry can be implemented without the added external circuitry of a voltage booster circuit or a pre-charge circuit.

Some embodiments include an improved gate driver circuit including a level shifter and gate-drive configured to be selectively coupled to one of a first output source potential or a second output source potential, and to convert an input switch signal having a first voltage to an output switch signal having a second voltage, wherein the gate driver circuit is configured to control a corresponding transistor switch of a power converter. In embodiments of the power converter where a charge pump is used to perform the power conversion, the first output source potential comes from a first voltage node of the charge pump, and the second output source potential comes from a second, different voltage node of the charge pump.

A significant benefit of the improved gate driver and the associated power converter configuration is that the circuitry can be implemented without the added external circuitry of a pre-charge circuit.

Embodiments of the invention may include both inventive concepts, thereby obviating the need for an external voltage booster circuit and an external pre-charge circuit.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 4A is a schematic diagram of a first embodiment of the first input voltage selector of FIG. 3B.

FIG. 4B is a schematic diagram of a second embodiment of the first input voltage selector of FIG. 3B.

FIG. 5A is a schematic diagram of a first variant embodiment of the UVLO circuit of FIG. 3B.

FIG. 5B is a schematic diagram of a second variant embodiment of the UVLO circuit of FIG. 3B.

FIG. 10 is a process flow chart showing a method of providing power for a gate driver circuit of a corresponding transistor switch of a power converter.

Like reference numbers and designations in the various drawings indicate like elements.

DETAILED DESCRIPTION

The present invention encompasses circuits and methods relating to a power converter that can be started and operated in a reversed unidirectional manner or in a bidirectional manner while providing sufficient voltage for an associated auxiliary circuit and start-up without the added external circuitry of a voltage booster and/or a pre-charge circuit—that is, with zero external components for some embodiments, or a reduced number of external components for other embodiments.

Selective Voltage Inputs to Converter Auxiliary Circuit

Figure 2A:
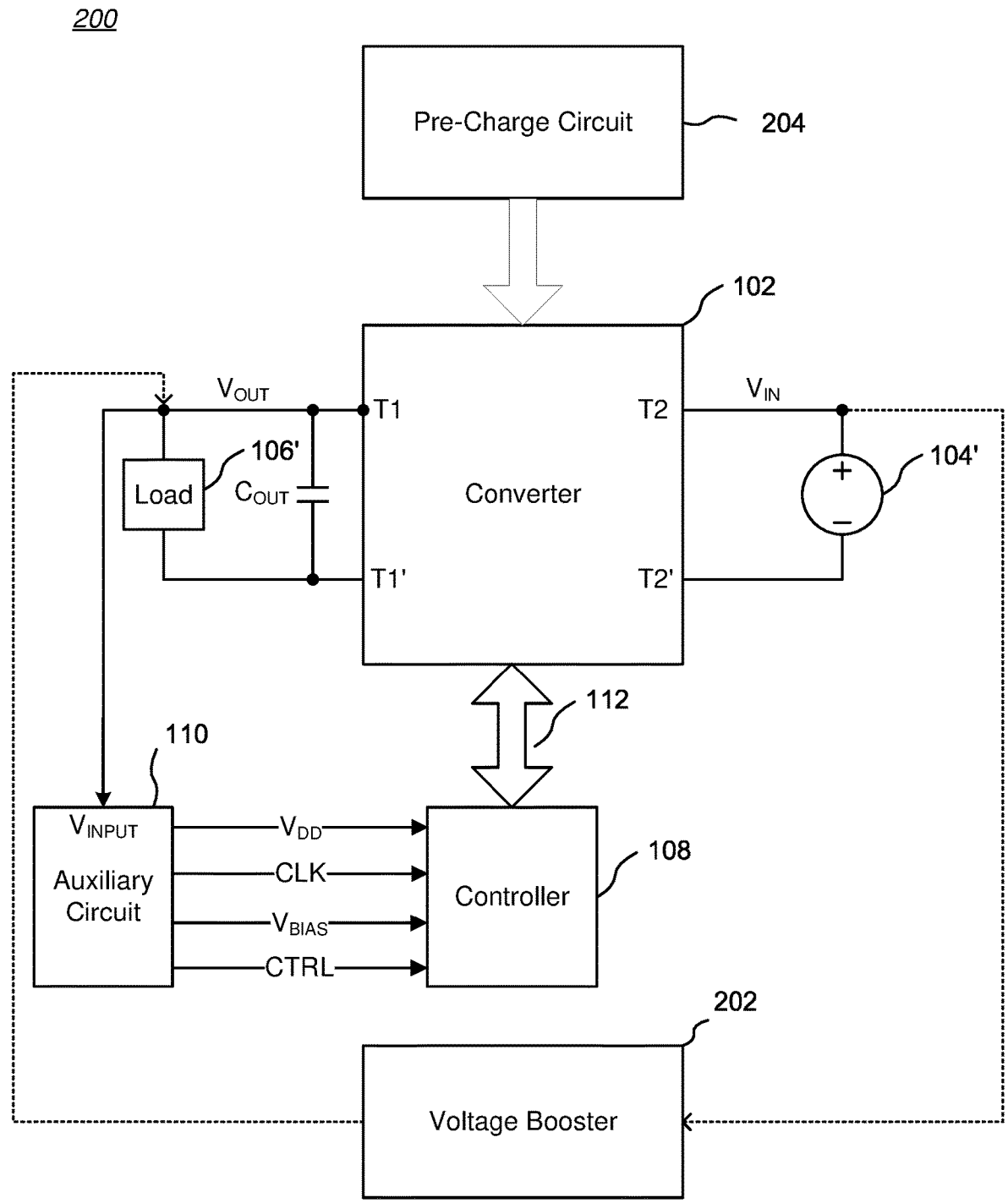
FIG. 2A shows a block diagram of a reverse-operation configuration of the unidirectional power converter of FIG. 1A in which the voltage source and load are swapped compared to the voltage source and load shown in FIG. 1A.
Figure 2B:
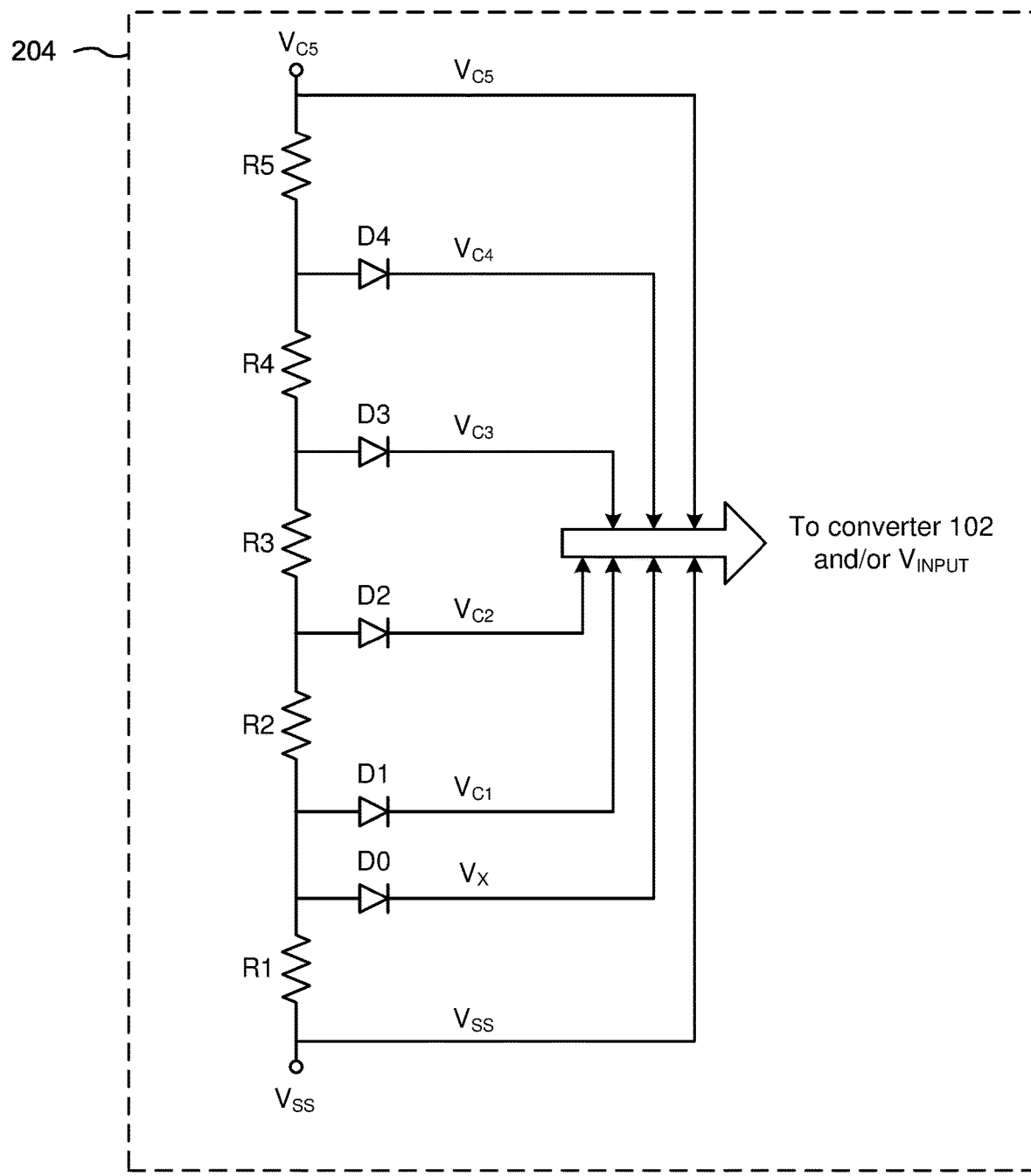
FIG. 2B is a schematic diagram of one embodiment of the pre-charge circuit of FIG. 2A that couples to one or more nodes within the converter circuit and/or to $V_{INPUT}$ of the auxiliary circuit.
Figure 3A:
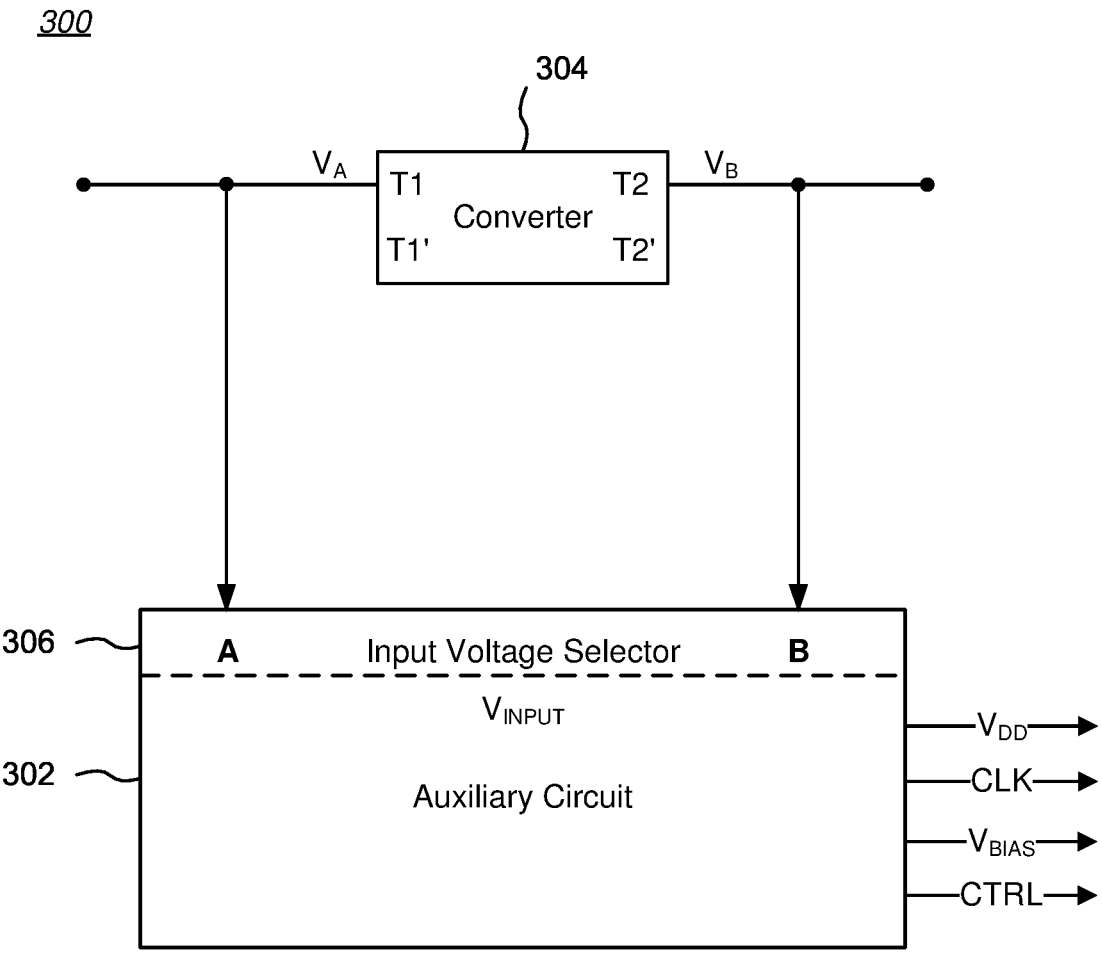
FIG. 3A is a block diagram of a first embodiment of the present invention, showing a dual voltage arrangement for an auxiliary circuit for a converter circuit.

FIG. 3A is a block diagram 300 of a first embodiment of the present invention, showing a dual voltage arrangement for an auxiliary circuit 302 for a converter circuit 304. The converter circuit 304 may be like the converter circuit 102 of FIG. 1A and FIG. 2A, but the voltage labels have been changed to $V_A$ and $V_B$ rather than $V_{IN}$ and $V_{OUT}$, to reflect that the converter circuit 304 may be operated in a reversed unidirectional manner or in a bidirectional manner. The auxiliary circuit 302 may be similar to the auxiliary circuit 110 of FIG. 1A, with the addition of an input voltage selector 306 having inputs A and B respectively coupled to $V_A$ and $V_B$.

The input voltage selector 306 functions as an analog multiplexor, allowing selection of either $V_A$ or $V_B$ as the input voltage $V_{INPUT}$ to the auxiliary circuit 302. Internal to the auxiliary circuit 302, the voltage from $V_A$ or $V_B$ from the selected input A or B is used to power various subcircuits, such as a UVLO circuit 124 and a voltage regulator 122 (see FIG. 1B). The input voltage selector 306 may be integrated on the same integrated circuit (IC) die as part of the auxiliary circuit 302, or may be a separate IC die, such as in a module containing an IC die embodiment of the auxiliary circuit 302.

In some embodiments, control of which input, A or B, to use as the input voltage $V_{INPUT}$ may be positively controlled, for example, by a selection signal (or signals) from the controller 108 (not shown in FIG. 3A) that selects input A or input B depending on which is coupled to the greater of the two applied voltages $V_A$, $V_B$. Further, input voltage selection may be controlled based on a knowledge of the existing forward or reverse configuration of the converter circuit 304, rather than on a determination of the relative voltages at $V_A$ and $V_B$. Such knowledge may be, for example, a mode setting signal from the controller 108 or a signal from a trim or memory component within the controller 108. In other embodiments, the input voltage selector 306 may self-select the greater of the two applied voltages $V_A$ and $V_B$ (see examples below).

Thus, for example, if the converter circuit 304 is used in a step-down power converter run in a forward (step-down) direction, then $V_A$ will be the greater voltage at all times, and accordingly input A of the input voltage selector 306 will be selected to provide power to the auxiliary circuit 302. However, if that same converter circuit 304 is run in a reverse (step-up) direction, then $V_B$ will be the greater voltage until after the converter circuit 304 is operational, and accordingly input B of the input voltage selector 306 will be selected to provide power to the auxiliary circuit 302 during a startup phase, after which input A of the input voltage selector 306 may be selected (or is self-selected) to provide power to the auxiliary circuit 302. After startup, during steady-state operation of the converter circuit 304, it is generally more efficient to continue powering the auxiliary circuit 302 off the lower of $V_A$ or $V_B$ as long as that voltage meets or exceeds the specified minimum voltage $V_{MIN}$.

Similarly, if the converter circuit 304 is used in a step-up power converter run in a forward (step-up) direction, then $V_A$ will be the greater voltage until the converter circuit 304 is operational, and accordingly input A of the input voltage selector 306 will be selected to provide power to the auxiliary circuit 302 during a startup phase, after which input B of the input voltage selector 306 may be selected (or is self-selected) to provide power to the auxiliary circuit 302. However, if that same converter circuit 304 is run in a reverse (step-down) direction, then $V_B$ will be the greater voltage at all times, and accordingly input B of the input voltage selector 306 will be selected to provide power to the auxiliary circuit 302. Again, after startup, during steady-state operation of the converter circuit 304, it is generally more efficient to continue powering the auxiliary circuit 302 off the lower of $V_A$ or $V_B$ as long as that voltage meets or exceeds the specified minimum voltage $V_{MIN}$.

Figure 3B:
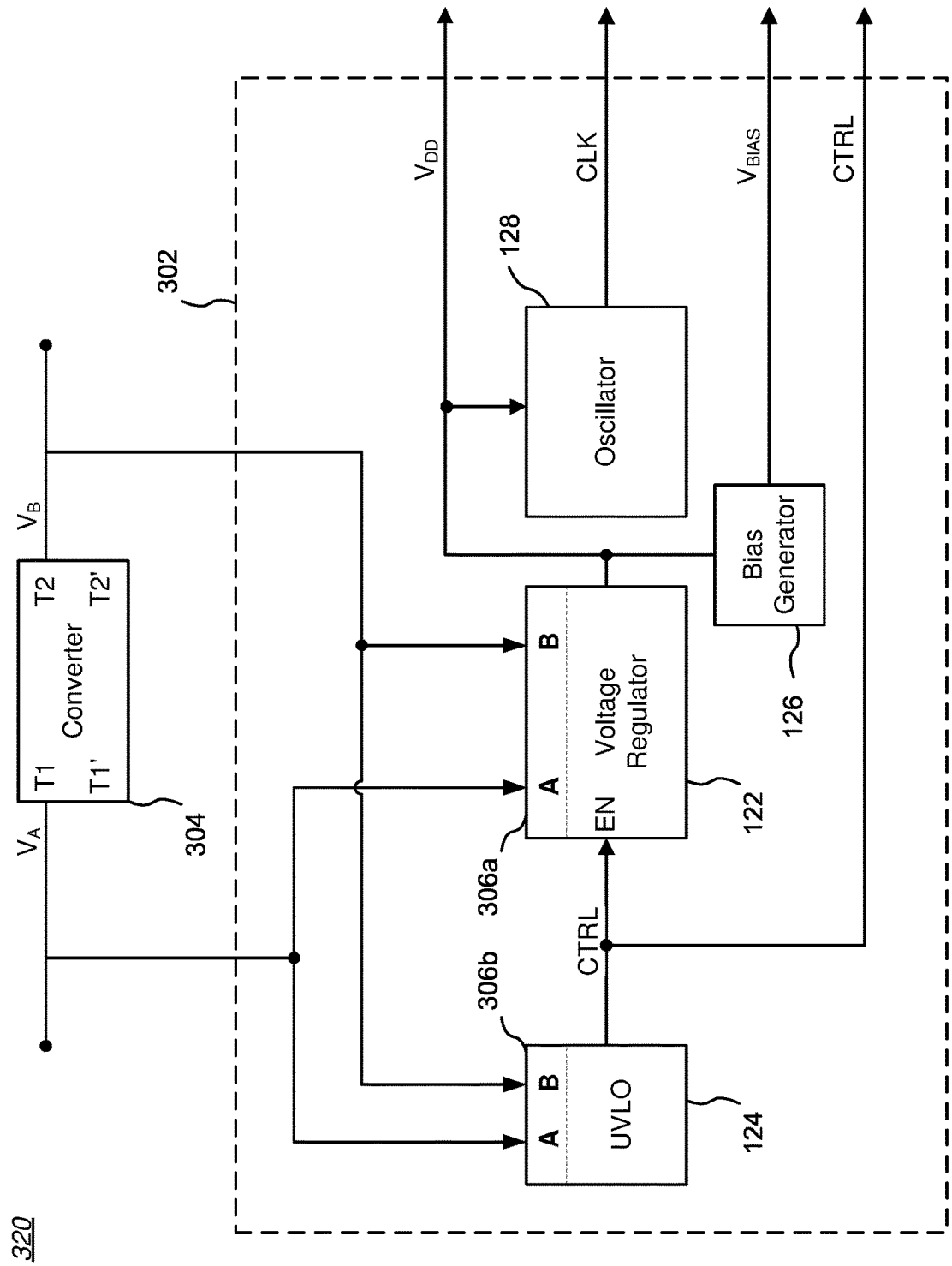
FIG. 3B is a block diagram of a second embodiment of the present invention, showing a dual input voltage selector arrangement for an auxiliary circuit for a converter circuit.

FIG. 3A shows a single input voltage selector 306 for the auxiliary circuit 302. In alternative embodiments, each sub-circuit within the auxiliary circuit 302 that requires selection of $V_A$ or $V_B$ as an input voltage may have its own voltage selector circuit. For example, FIG. 3B is a block diagram 320 of a second embodiment of the present invention, showing a dual input voltage selector arrangement for an auxiliary circuit 302 for a converter circuit 304. In the illustrated embodiment, the voltage regulator 122 has a respective first input voltage selector 306a having inputs A and B respectively coupled to $V_A$ and $V_B$, and the UVLO circuit 124 has a respective second input voltage selector 306b having inputs A and B respectively coupled to $V_A$ and $V_B$. One advantage of the illustrated embodiment is that the first and second input voltage selectors 306a, 306b can be tailored to the circuit characteristics of the voltage regulator 122 and the UVLO circuit 124. The first and second input voltage selectors 306a, 306b may be identical circuits (but possibly with different circuit values) or may be different circuits, and there are a number of ways in which either input voltage selector 306a, 306b may be implemented.

For example, FIG. 4A is a schematic diagram of a first embodiment 306a1 of the first input voltage selector 306a of FIG. 3B. The voltage from $V_A$ of the converter circuit 304 is applied to a first diode D1 coupled in series with a first resistor R1. In parallel, voltage from $V_B$ of the converter circuit 304 is applied to a second diode D2 coupled in series with a second resistor R2. An output node, $V_{SEL}$, is coupled to both resistors R1, R2 (note that the order of the diodes D1, D2 and corresponding resistors R1, R2 may be reversed without affecting operation). The diodes D1, D2 essentially isolate the voltage of either input from the other input. The output voltage at $V_{SEL}$ is the maximum of $V_A$ and $V_B$ (minus the forward voltage of each diode), and the circuit self-selects the greater voltage to output as $V_{SEL}$. To favor one input over the other input during steady-state operation for efficiency reasons, the value of the resistor in the favored path can be designed to be much lower than the value of the resistor in the disfavored path.

As another example, FIG. 4B is a schematic diagram of a second embodiment 306a2 of the first input voltage selector 306a of FIG. 3B. The voltage from $V_A$ of the converter circuit 304 is applied to a first switch S1, which is optionally coupled in parallel with a first diode D1 (which, for some switch technologies, may be an inherent parasitic diode), and voltage from $V_B$ of the converter circuit 304 is applied to a second switch S2, which is optionally coupled in parallel with a second diode D2 (which again, for some switch technologies, may be an inherent parasitic diode). An output node, $V_{SEL}$, is coupled to both switches S1, S2. The switches S1, S2 may be positively controlled by selection signals, such as from the controller 108. If the voltage from $V_A$ of the converter circuit 304 is detected to be higher than the voltage from $V_B$, the controller 108 can close switch S1 and open switch S2 to pass through the input voltage from $V_A$ to $V_{SEL}$. Conversely, if the voltage from $V_A$ is detected to be lower than the voltage from $V_B$, the controller 108 can open switch S1 and close switch S2 to pass through the input voltage from $V_B$ to $V_{SEL}$. Alternatively, the state of the switches S1, S2 may be set by the controller 108 based on information regarding whether the converter circuit 304 is to operate in a forward or reverse direction.

If the diodes D1, D2 are optionally or inherently coupled in parallel with the respective switches S1, S2, the second embodiment 306a2 can operate like the first embodiment 306a1 of FIG. 4A and self-select the greater of the input voltages $V_A$ and $V_B$ to output as $V_{SEL}$ independently of the switches S1, S2. Closing the switch coupled to the forward-conducting diode passes through more of the corresponding input voltage from either $V_A$ or $V_B$ to $V_{SEL}$ by bypassing the diode forward voltage drop with a much smaller switch voltage drop. This allows for a more efficient solution while ensuring a greater voltage margin above the $V_{MIN}$ needed at $V_{INPUT}$ to the auxiliary circuit 302.

Either of the embodiments 306a1, 306a2 shown in FIGS. 4A and 4B may be used as an input voltage selector 306b for the UVLO circuit 124. As should be clear, other variants of the circuits shown in FIGS. 4A and 4B, as well as other analog multiplexor circuits, may be used for the input voltage selectors 306, 306a, 306b.

In other embodiments, the function of an input voltage selector may be more intimately integrated within the circuitry of the voltage regulator 122 and/or the UVLO circuit 124. For example, positively controlled or self-selecting circuitry may enable or disable subcircuits within the voltage regulator 122 and/or the UVLO circuit 124 to effectively choose a subcircuit powered by one of $V_A$ or $V_B$ from the converter circuit 304.

For example, FIG. 5A is a schematic diagram of a first variant embodiment 124a of the UVLO circuit 124 of FIG. 3B. The voltage from $V_A$ of the converter circuit 304 is applied to a first under-voltage lockout circuit UVLO A, while the voltage from $V_B$ of the converter circuit 304 is applied to a second under-voltage lockout circuit UVLO B. An output selector 310 coupled to UVLO A and UVLO B selects which under-voltage lockout circuit to use to output a CTRL signal to other circuitry in response to an input Select signal. The Select signal may be generated, for example, by the controller 108 based on a comparison of the voltage from $V_A$ and from $V_B$. Alternatively, the Select signal may also be generated by the controller 108 based on information regarding whether the converter circuit 304 is to operate in a forward or reverse direction. In a variant embodiment, if the under-voltage lockout circuits UVLO A, UVLO B can be individually enabled and disabled, the output selector 310 may be omitted and the Select signal may be used to directly select the under-voltage lockout circuit UVLO A, UVLO B to be coupled to the CTRL output.

As another example, FIG. 5B is a schematic diagram of a second variant embodiment 124b of the UVLO circuit 124 of FIG. 3B. The voltage from $V_A$ of the converter circuit 304 is applied to a first resistive divider subcircuit comprising series-connected resistors R1A, R2A, the central node of which is coupled by a diode D1 to a first input of a comparator 322. The voltage from $V_B$ of the converter circuit 304 is applied to a second resistive divider subcircuit comprising series-connected resistors R1B, R2B, the central node of which is coupled by a diode D2 to the first input of the comparator 322. A second input of the comparator 322 is coupled to a reference voltage source 324. The resistive divider subcircuits scale the input voltages $V_A$, $V_B$ to match the voltage input limits of the comparator 322, and the diodes D1, D2 isolate the voltage of either input to the other input. The scaled voltage applied to the first input of the comparator 322 is the maximum of $V_A$ and $V_B$, and thus the circuit self-selects the greater voltage to compare to the reference voltage source 324 and outputs a CTRL signal. Similar to FIG. 4B, the diodes D1, D2 at the first input of the comparator 322 in FIG. 5B may be replaced with switches that are positively controlled by selection signals, such as from the controller 108.

As should be clear, other variants of the subcircuit selection circuitry shown in FIGS. 5A and 5B may be used for the UVLO circuit 124 of FIG. 3B. Similarly, subcircuit selection circuitry may be used for the voltage regulator 122 to effectively determine which applied voltage $V_A$, $V_B$ will power the voltage regulator 122.

A significant benefit of the circuit architectures shown in FIGS. 3A and 3B is that the analog multiplexor and/or subcircuit selection circuitry can be implemented within the auxiliary circuit 302, thereby eliminating the need for added external circuitry of a voltage booster circuit or a pre-charge circuit.

Selective Voltage Inputs to Gate Driver Circuits

The embodiments of FIGS. 3A and 3B modify the auxiliary circuit 302 to select the greater of the voltages $V_A$, $V_B$ from the converter circuit 304 as a power source for the auxiliary circuit 302 during startup. In cases in which a normally step-up power converter is operated in the reverse direction (i.e., in a step-down mode), the pre-charge circuit 204 (see FIG. 2A) may be eliminated in embodiments of the present invention.

Figure 6A:
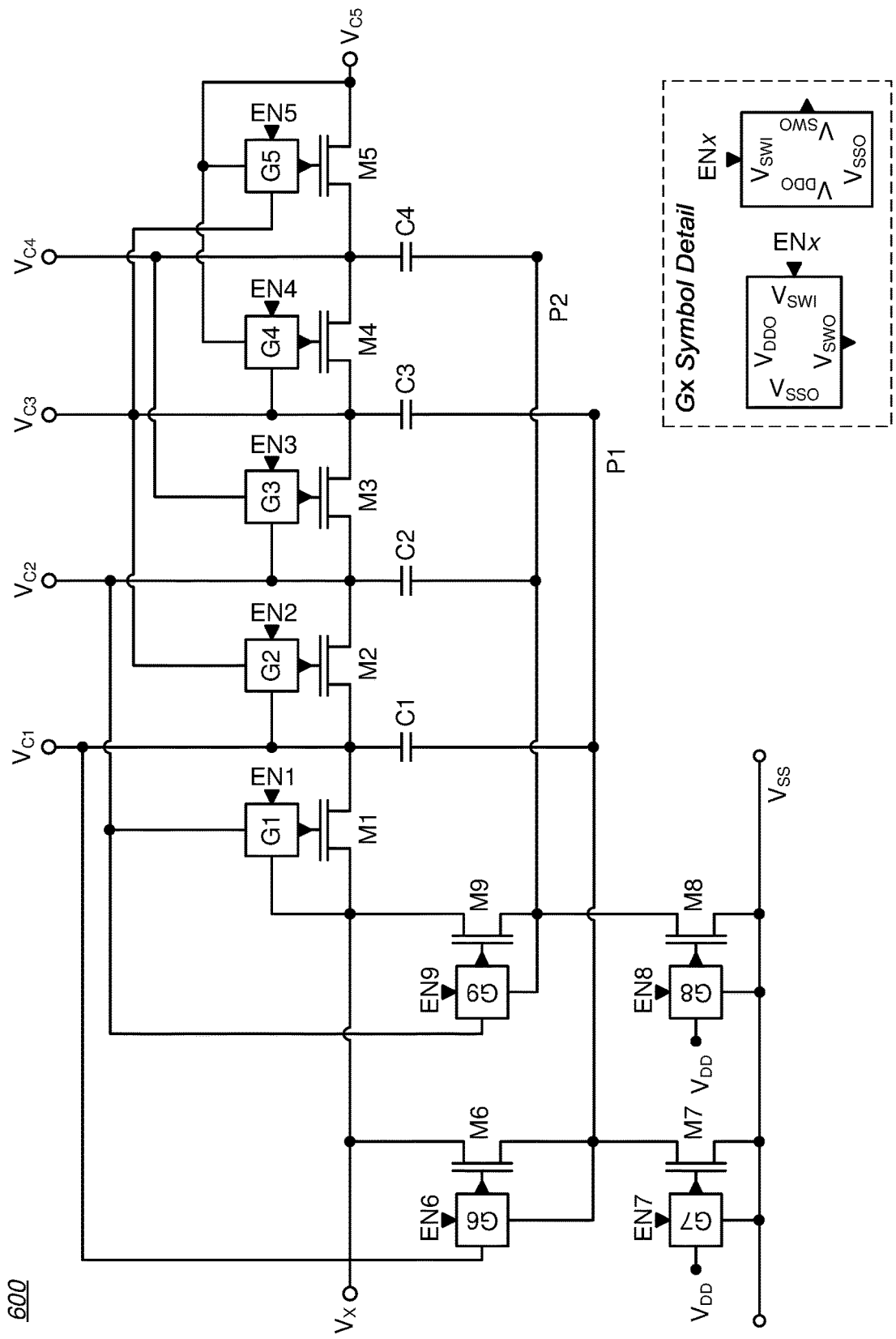
FIG. 6A is a circuit diagram of a prior-art converter circuit comprising a single-phase symmetric cascade multiplier having a step-up ratio of 1:5 and which may be used as an instance of the converter circuit of FIG. 1A.

It is useful to better understand the need for the pre-charge circuit 204, particularly for power converters that include switched-capacitor networks. FIG. 6A is a circuit diagram of a prior-art converter circuit 600 comprising a single-phase symmetric cascade multiplier having a step-up ratio of 1:5 and which may be used as an instance of the converter circuit 102 of FIG. 1A. The converter circuit 600 is configured to receive an input voltage (e.g., 5V) at node Vx and transform the input voltage into a higher output voltage at node $V_{C5}$ (e.g., 25V). The illustrated converter circuit 600 would be controlled by the controller 108 of FIG. 1A in known fashion. Referring to both converter circuit 600 and FIG. 1A, node Vx corresponds to input terminal T1 of converter circuit 102, node $V_{C5}$ corresponds to the output terminal T2 of converter circuit 102, and node $V_{SS}$ corresponds to both terminals T1' and T2' of converter circuit 102.

A cascade multiplier is a switched-capacitor network that can provide a high conversion gain. As used in this disclosure, conversion gain represents (1) a voltage gain if the switched-capacitor network produces an output voltage that is larger than the input voltage ($V_{OUT} > V_{IN}$), or (2) a current gain if the switched-capacitor network produces an output voltage that is smaller than the input voltage ($V_{IN} > V_{OUT}$). Energy is transferred from the input to the output by cycling the cascade multiplier through different topological states. Charge is transferred from the input voltage to the output voltage via a charge transfer path. The number and configuration of the capacitors in each topological state sets the conversion gain.

In the illustrated example, the converter circuit 600 includes five series-connected MOSFET switches M1-M5. Each MOSFET switch M1-M5 may comprise a stack of series-connected MOSFETs having common gate connections and configured to function as a single switch. For convenience in discussing switching sequences, switches M1, M3, and M5 will sometimes be referred to collectively as the "odd switches" and switches M2 and M4 will sometimes be referred to collectively as the "even switches."

The converter circuit 600 also includes first and second "low-side" MOSFET phase switches M7, M8 and first and second "high-side" MOSFET phase switches M6, M9. The low-side phase switches M7, M8 can connect first and second phase-nodes P1, P2 to a potential $V_{SS}$ (usually circuit ground). The high-side phase-switches M6, M9 can connect the first and second phase-nodes P1, P2 to Vx. For convenience in discussing switching sequences, the high-side phase-switch M6 and the low-side phase-switch M8 will sometimes be referred to collectively as the "even phase-switches" and the low-side phase-switch M7 and the high-side phase-switch M9 will sometimes be referred collectively to as the "odd phase-switches."

A first pump capacitor C1 connects a first stack-node $V_{C1}$ between switches M1 and M2 to phase-node P1. Similarly, a third pump capacitor C3 connects a third stack-node $V_{C3}$ between switches M3 and M4 to phase-node P1. A second pump capacitor C2 connects a second stack-node $V_{C2}$ between switches M2 and M3 to phase-node P2. Similarly, a fourth pump capacitor C4 connects a fourth stack-node $V_{C4}$ between switches M4 and M5 to phase-node P2. A fifth stack-node, $V_{C5}$, connects to a terminal of the converter circuit 600.

The illustrated converter circuit 600 has four stages. The first stage includes switch M1, first stack-node $V_{C1}$, and first pump capacitor C1; the second stage includes switch M2, second stack-node $V_{C2}$, and second pump capacitor C2; the third stage includes switch M3, third stack-node $V_{C3}$, and third pump capacitor C3; and the fourth stage includes switch M4, fourth stack-node $V_{C4}$, and fourth pump capacitor C4. A fifth series switch M5 connects the fourth stage to the fifth stack-node, $V_{C5}$.

A clock source in the controller 108 generates non-overlapping clock waveforms φ1 and φ2 that are coupled to and control the ON/OFF state of the various switches M1-M9. The controller 108 outputs a set of control-signals 112 to the converter circuit 600 which cause the series switches M1-M5, the low-side phase-switches M7, M8, and the high-side phase-switches M6, M9 to change states according to a specific sequence. As a result, the converter circuit 600 repeatedly transitions between first and second operating states at a selected frequency.

For example, during a first operating state defined by the φ1 clock waveform having a logic "1" state and the φ2 clock waveform having a logic "0" state, the controller 108 (1) closes the odd switches M1, M3, M5, the low-side phase switch M7, and the high-side phase switch M9, and (2) opens the even switches M2, M4, the high-side phase switch M6, and the low-side phase switch M8. During a second operating state defined by the φ2 clock waveform having a logic "1" state and the φ1 clock waveform having a logic "0" state, the controller 108 (1) opens the odd switches M1, M3, M5, the low-side phase switch M7, and the high-side phase switch M9, and (2) closes the even switches M2, M4, the high-side phase switch M6, and the low-side phase switch M8. The controller 108 controls and sequences transitions of all the switches M1-M9 in such a way as to incorporate any necessary dead-time needed when transitioning between the first and second operating states. As a consequence of alternating between the first operating state and the second operating state, charge is multiplied and conveyed from Vx to $V_{C5}$ in known fashion.

Figure 6B:
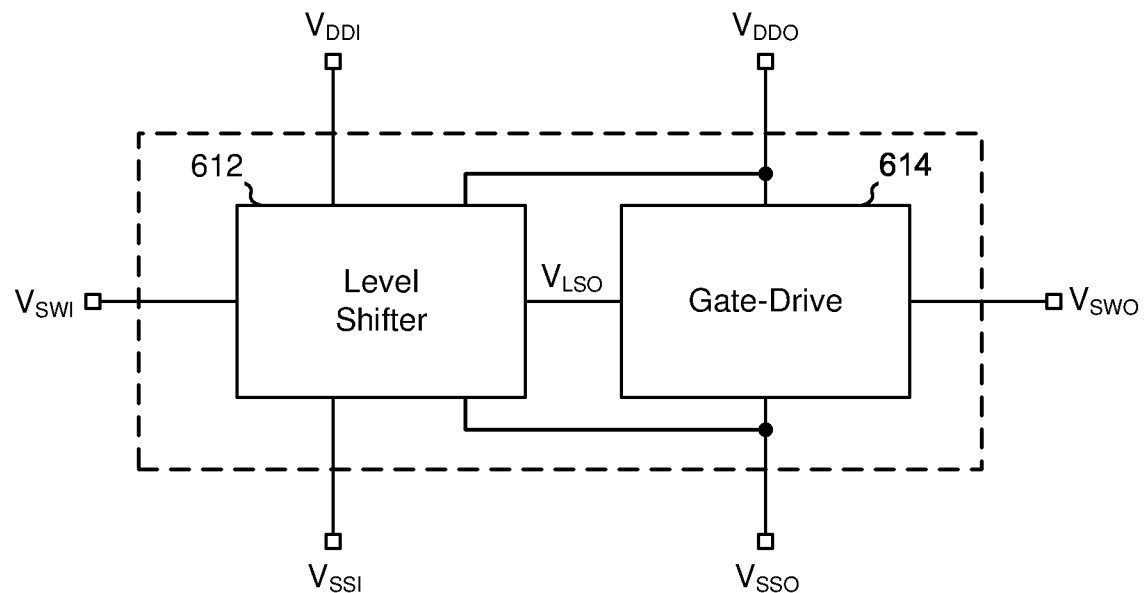
FIG. 6B is a block diagram of a prior art gate driver circuit.

As is known in the art, switching signals to the MOSFET switches M1-M9 are applied through respective gate driver circuits G1-G9 so as to provide suitable voltage levels for turning each MOSFET switch OFF (blocking) or ON (conducting) in timely fashion. FIG. 6B is a block diagram of a prior art gate driver circuit 610. The gate driver circuit 610 includes a level shifter 612 that is coupled to input source $V_{DDI}$ and sink $V_{SSI}$ potentials, and to output source $V_{DDO}$ and sink $V_{SSO}$ potentials. The level shifter 612 translates an input switching signal $V_{SWI}$ from one voltage domain to another voltage domain. A level-shifted output voltage $V_{LSO}$ of the level shifter 612 is coupled to a gate-drive 614 which provides a low-impedance version of $V_{LSO}$ at $V_{SWO}$ to drive the gate terminal of an associated MOSFET switch Mx in a timely fashion.

Referring back to the converter circuit 600 of FIG. 6A, the gate driver circuits G1-G9 are shown in simplified block form coupled to respective switches M1-M9 and connected to output source and sink potentials. Each gate driver circuit G1-G9 has a corresponding input switching signal EN1-EN9 (one of clock waveforms φ1 or φ2) which controls the switching state of the respective switch M1-M9. All of the gate driver circuits G1-G9 are coupled to common input source $V_{DDI}$ and sink $V_{SSI}$ potentials (not shown for clarity), where the $V_{DD}$ voltage generated from the auxiliary circuit 110 is coupled to the common input source $V_{DDI}$. For both power and area efficiency, gate driver circuits G1-G6 and G9 are coupled to nodes $V_{C1}$-$V_{C5}$ of the converter circuit 600 itself as output source $V_{DDO}$ and sink $V_{SSO}$ potentials. In the particular embodiment of FIG. 6A, MOSFET switches M1-M4, M6-M9 are N-type transistors, while MOSFET switch M5 is a P-type transistor. This is also reflected in the output source $V_{DDO}$ and sink $V_{SSO}$ potentials shown for each gate driver circuit G1-G9. The gate driver circuits G7-G8 are coupled to the $V_{DD}$ voltage generated from the auxiliary circuit 110 for both their input source $V_{DDI}$ potential and output source $V_{DDO}$ potential.

In a forward step-up operational mode, nodes $V_{C1}$-$V_{C5}$ are initially (i.e., at startup) pumped above the voltage applied at Vx due to inherent body-diode paths in parallel with each of the switches M1-M5, and, eventually, sufficient output source $V_{DDO}$ and sink $V_{SSO}$ potentials are reached for proper operation of the gate driver circuits G1-G9 whereby the switches M1-M5 can take over. However, in a reverse step-down operational mode, the input voltage is applied at node $V_{C5}$ and the output voltage is to be generated at node Vx. Nodes Vx, $V_{C1}$-$V_{C4}$ may start out at or close to $V_{SS}$ ground potential; hence, sufficient output source $V_{DDO}$ and sink $V_{SSO}$ potentials are not yet available for proper operation of the gate driver circuits G1-G9, further worsening the circular startup problem. Accordingly, a pre-charge circuit 204 is typically used to provide initial and adequate voltages from the input voltage at node $V_{C5}$ to the nodes Vx, $V_{C1}$-$V_{C4}$ within the converter circuit 600 to provide sufficient output source $V_{DDO}$ and sink $V_{SSO}$ potentials for initial operation of the gate drivers G1-G9. After startup, the voltages at nodes Vx, $V_{C1}$-$V_{C4}$ are then adequately supplied by the nature of the converter circuit's 600 steady-state operation, and accordingly the pre-charge circuit 204 may be disabled or disconnected.

Figure 7A:
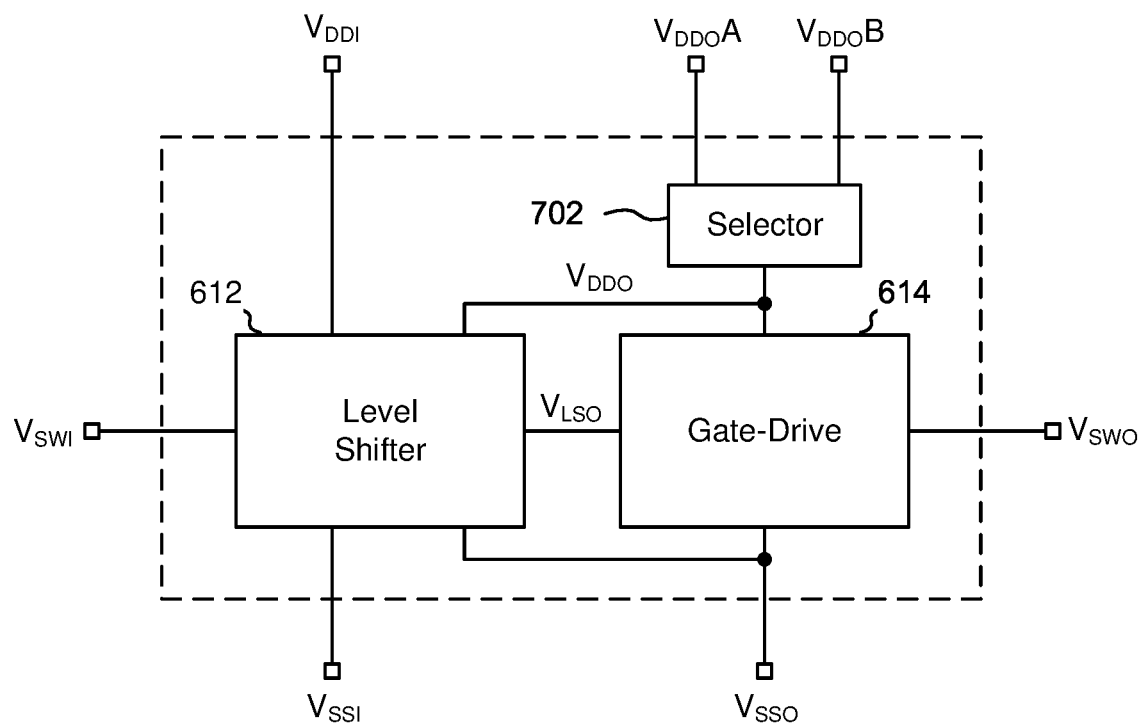
FIG. 7A is a block diagram of an improved gate driver circuit that may be used in conjunction with the converter circuit of FIG. 6A.

FIG. 7A is a block diagram of an improved gate driver circuit 700 that may be used in conjunction with the converter circuit 600 of FIG. 6A. The improved gate driver circuit 700 is similar in many regards to the gate driver circuit 610 of FIG. 6B. Thus, the gate driver circuit 700 includes a level shifter 612 that is coupled to input source $V_{DDI}$ and sink $V_{SSI}$ potentials, and to output source $V_{DDO}$ and sink $V_{SSO}$ potentials. The level shifter 612 translates an input switching signal $V_{SWI}$ from one voltage domain to another voltage domain. A level-shifted output voltage $V_{LSO}$ of the level shifter 612 is coupled to a gate-drive 614 which provides a low-impedance output at $V_{SWO}$ to drive the gate terminal of an associated MOSFET switch Mx in a timely fashion.

In addition, the gate driver circuit 700 includes a selector 702 that functions as an analog multiplexor, allowing selection of one of two input voltages, $V_{DDOA}$ or $V_{DDOB}$, for the output source $V_{DDO}$ potential used within the gate driver circuit 700. The selector 702 may be controlled, for example, by the controller 108 (e.g., based on information regarding whether the converter circuit 304 is to operate in a forward or reverse direction), or utilize a self-selecting embodiment similar to that of FIG. 4A. Thus, the gate driver circuit 700 is a dual-voltage device with respect to the output source $V_{DDO}$ potential. Once an input voltage, $V_{DDO}A$ or $V_{DDO}B$, is coupled through by the selector 702, the operation of the gate driver circuit 700 is essentially the same as a conventional gate driver.

Figure 1A:
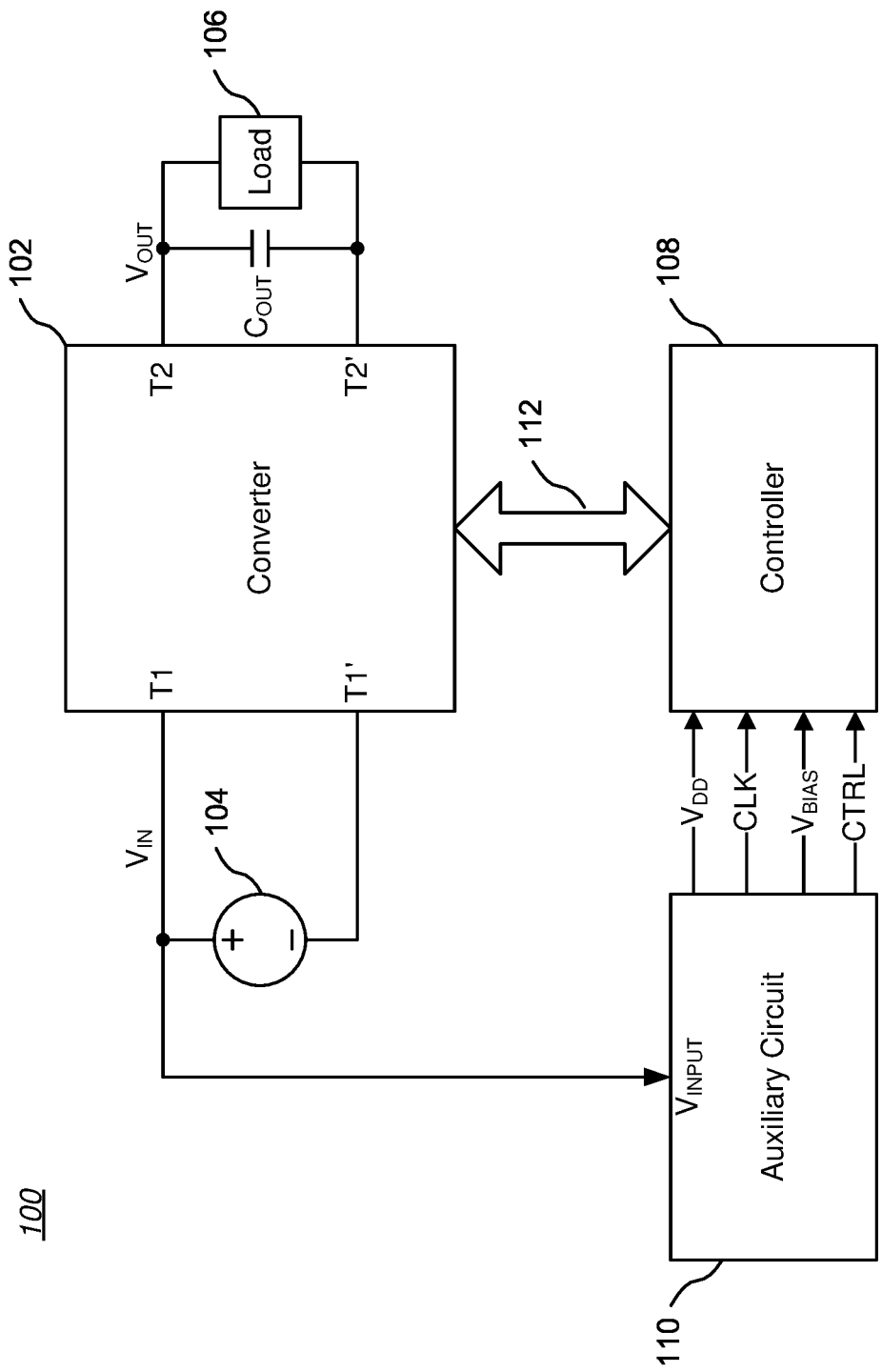
FIG. 1A is a block diagram of a prior art unidirectional power converter.
Figure 1B:
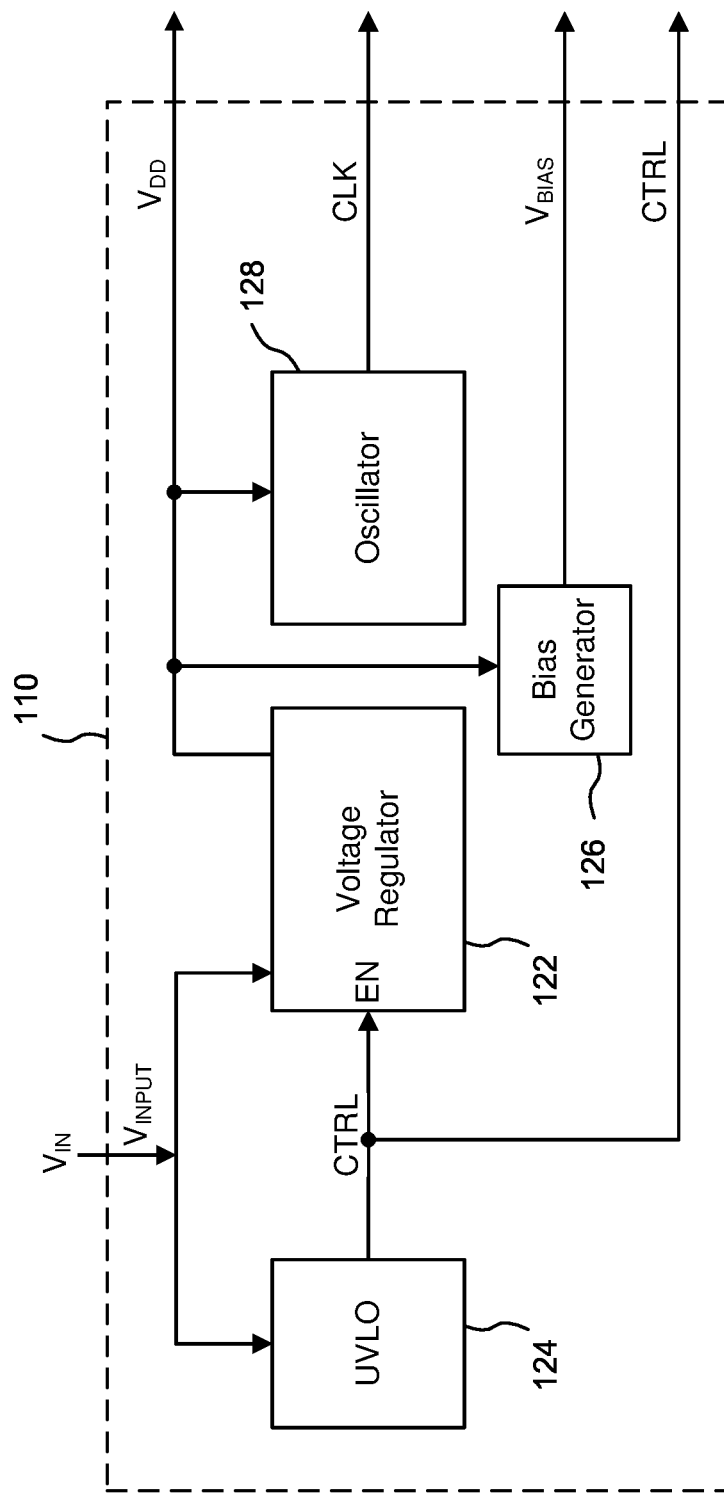
FIG. 1B is a block diagram showing one example of an auxiliary circuit for the power converter of FIG. 1A.
Figure 7B:
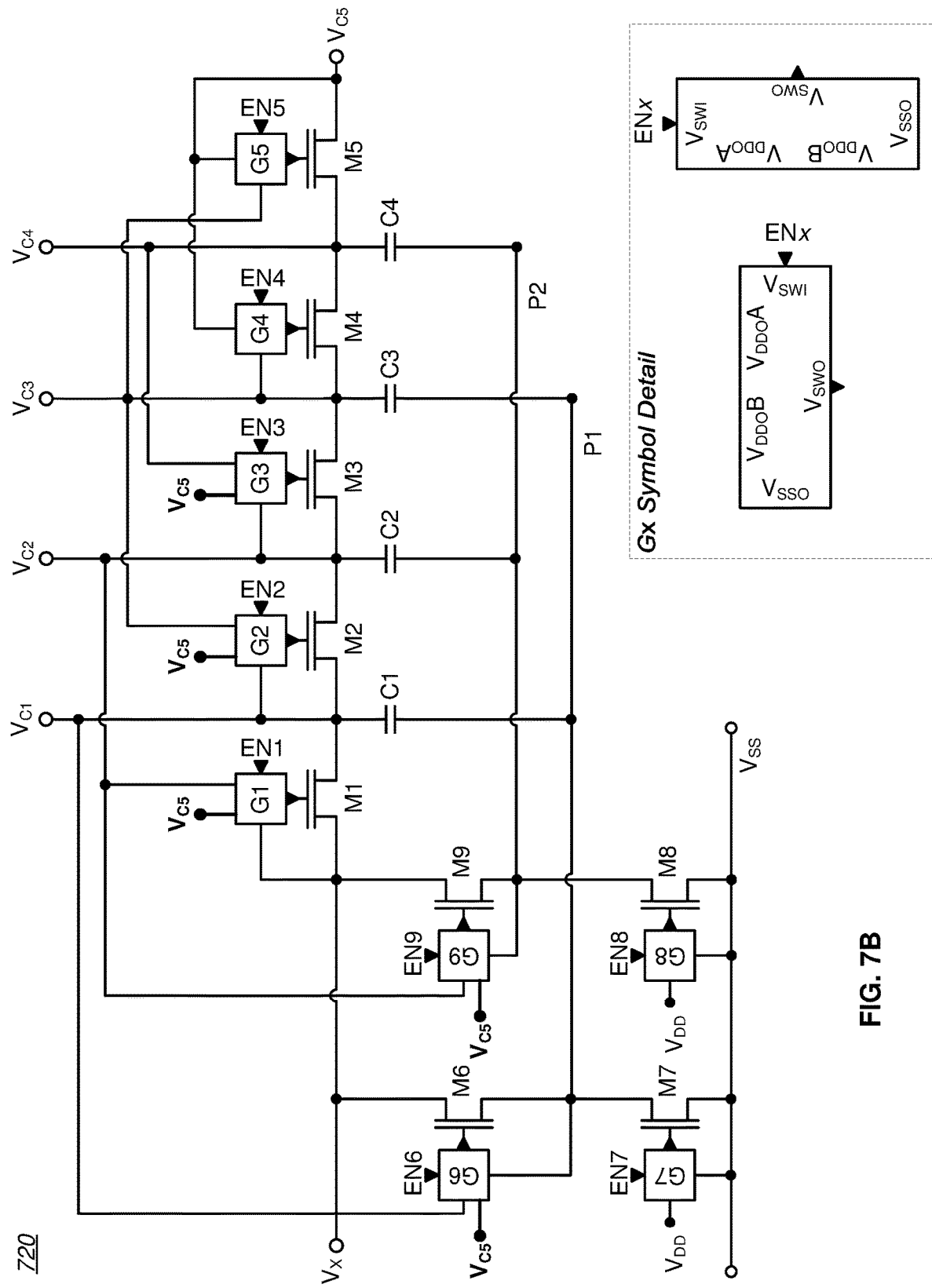
FIG. 7B is a circuit diagram of a modified converter circuit comprising a single-phase symmetric cascade multiplier having a step-up ratio of 1:5 and which may be used as an instance of the converter circuit of FIG. 1A.

FIG. 7B is a circuit diagram of a modified converter circuit 720 comprising a single-phase symmetric cascade multiplier having a step-up ratio of 1:5 and which may be used as an instance of the converter circuit 102 of FIG. 1A. In the illustrated embodiment, gate driver circuits G1-G3, G6, and G9 are instances of the gate driver circuit 700 of FIG. 7A. In the illustrated embodiment, a first input (e.g., $V_{DDO}A$) to each of gate drivers G1-G3, G6, and G9 is the same $V_{CX}$ node as in the example shown in FIG. 6A (i.e., $V_{C1}$-$V_{C4}$). A second input (e.g., $V_{DDO}B$) to each of gate drivers G1-G3, G6, and G9 is the reverse-direction input voltage applied (in this 4-stage example) at $V_{C5}$ (a "reverse mode input node"). Conventional single-source gate driver circuits G4 and G5 may be instances of the gate driver circuit 610 of FIG. 6B and remain coupled to $V_{C5}$ for their output source $V_{DDO}$ potential as in the example shown in FIG. 6A. Conventional single-source gate driver circuits G7 and G8 may be instances of the gate driver circuit 610 of FIG. 6B and also remain coupled to the $V_{DD}$ voltage generated from the auxiliary circuit 110 for both their input source $V_{DDI}$ potential and output source $V_{DDO}$ potential.

In a forward step-up operational mode, the selector 702 would select the respective stack-nodes $V_{C1}$-$V_{C4}$ as the output source $V_{PPO}$ potential for gate driver circuits G1-G3, G6, and G9. However, in a reverse step-down operational mode during the startup phase of the converter circuit 720, the selector 702 would select the reverse mode input node ($V_{C5}$, in this example) as the output source $V_{DDO}$ potential for the gate driver circuits G1-G3, G6, and G9 until sufficient voltage levels develop at the stack-nodes $V_{C1}$-$V_{C4}$ to support the gate driver circuits. Accordingly, regardless of forward or reverse operational mode, a sufficient output source $V_{DDO}$ potential is available for each of the gate driver circuits G1-G9. The improved gate driver circuit 700 thus effectively makes the illustrated converter circuit 720 self-biasing at startup.

A significant benefit of the improved gate driver circuit 700 and the circuit architecture shown in FIGS. 7A and 7B is that the circuitry can be implemented without the added external circuitry of a pre-charge circuit 204.

While a single-phase symmetric cascade multiplier has been used in the converter circuits 600 and 720 to illustrate the problem solved by the improved gate driver circuit 700, it should be noted that usage of the improved gate driver circuit 700 is not limited to switched-capacitor networks or charge pumps. This aspect of the present invention may also be applied to inductor-based regulators using transistor switches having one or more series-stacked switch stages.

Combination Embodiments

Embodiments of the example shown in FIG. 3A eliminate the need for an external voltage booster circuit 202. Embodiments of the examples shown in FIGS. 7A and 7B eliminate the need for an external pre-charge circuit 204. As should be clear, embodiments of the invention may include both inventive concepts, thereby obviating the need for an external voltage booster circuit 202 and an external pre-charge circuit 204. A combined embodiment thus allows a power converter to be started and operated in a reversed unidirectional manner or in a bidirectional manner with zero external components.

Methods

Another aspect of the invention includes methods for powering an auxiliary circuit, selecting a subcircuit of an auxiliary circuit, and powering a dual voltage input gate driver.

Figure 8:
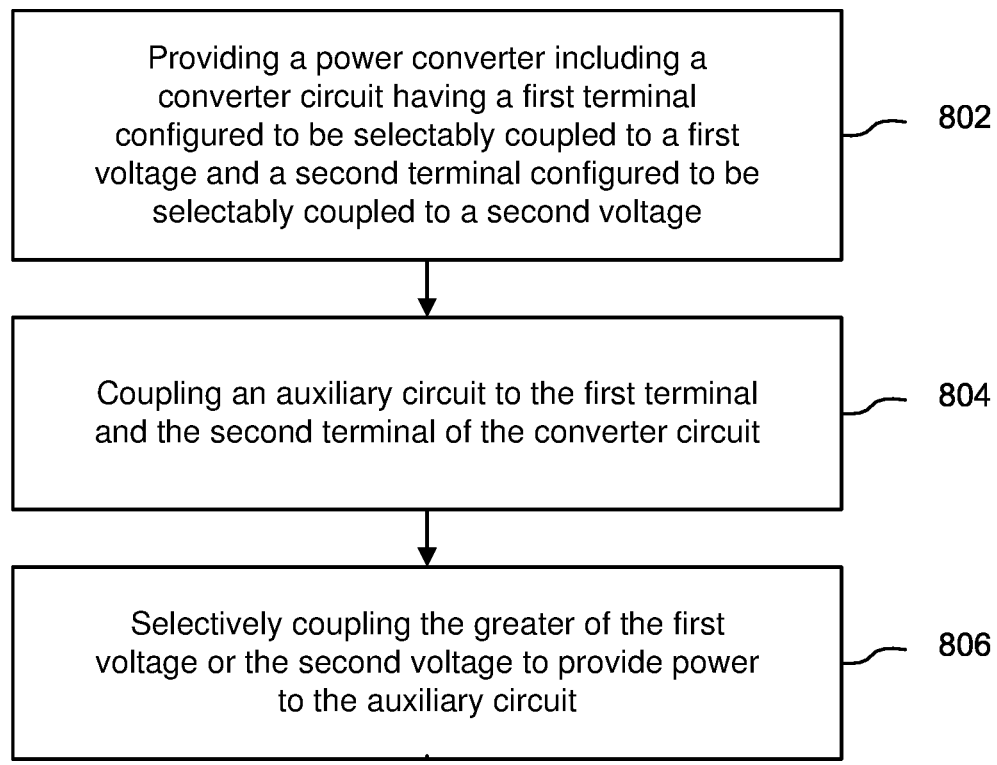
FIG. 8 is a process flow chart showing a first method of powering an auxiliary circuit of a power converter.

For example, FIG. 8 is a process flow chart 800 showing a method of powering an auxiliary circuit of a power converter. The process includes providing a power converter including a converter circuit having a first terminal configured to be selectably coupled to a first voltage and a second terminal configured to be selectably coupled to a second voltage (Block 802); coupling an auxiliary circuit to the first terminal and the second terminal of the converter circuit (Block 804); and selectively coupling the greater of the first voltage or the second voltage to provide power to the auxiliary circuit (Block 806). In an alternative method, selection of the first voltage or the second voltage may be based on a knowledge of the existing forward or reverse configuration of the converter circuit.

Figure 9:
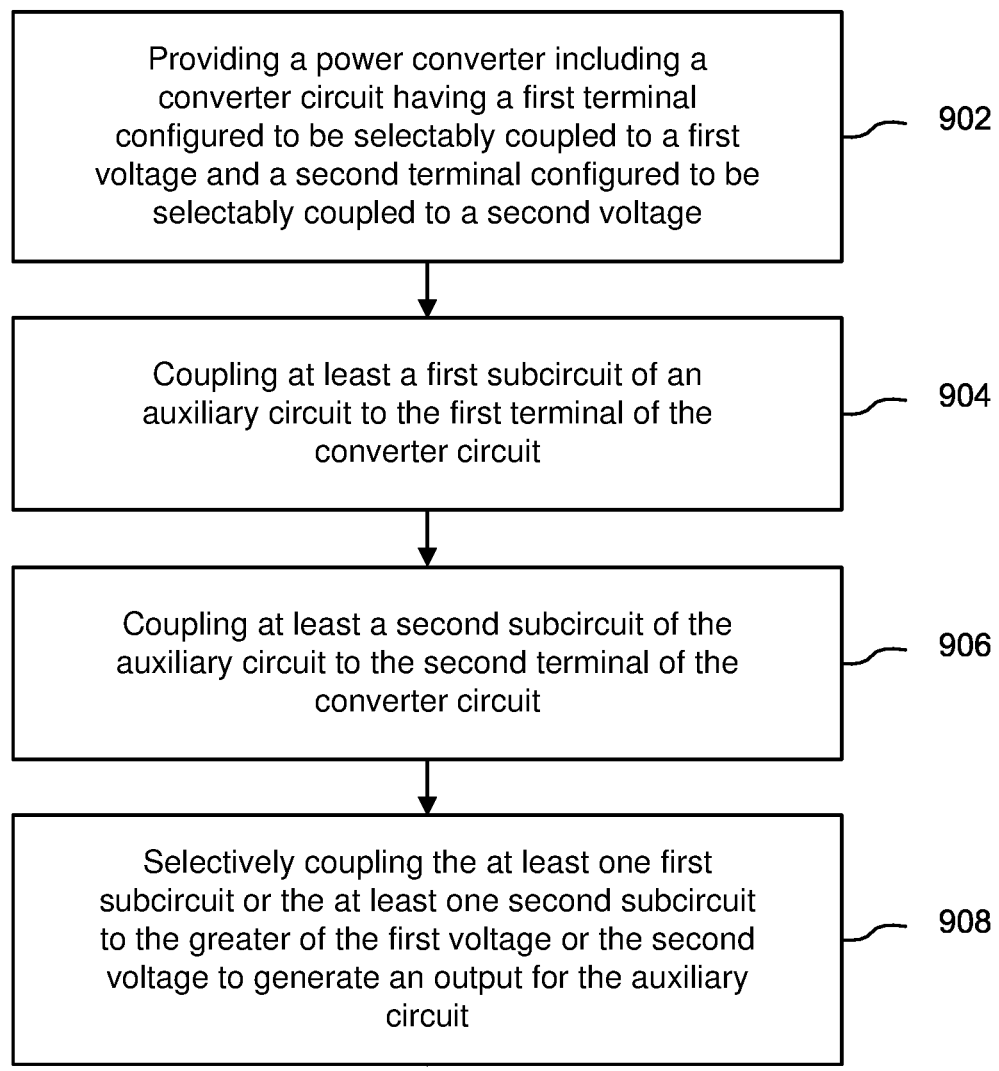
FIG. 9 is a process flow chart showing a method of selecting among subcircuits of a plurality of subcircuits of an auxiliary circuit of a power converter.

As another example, FIG. 9 is a process flow chart 900 showing a method of selecting among subcircuits of a plurality of subcircuits of an auxiliary circuit of a power converter. The power converter includes providing a power converter including a converter circuit having a first terminal configured to be selectably coupled to a first voltage and a second terminal configured to be selectably coupled to a second voltage (Block 902); coupling at least a first subcircuit of an auxiliary circuit to the first terminal of the converter circuit (Block 904); coupling at least a second subcircuit of the auxiliary circuit to the second terminal of the converter circuit (Block 906); and selectively coupling the at least one first subcircuit or the at least one second subcircuit to the greater of the first voltage or the second voltage to generate an output for the auxiliary circuit (Block 908).

As still another example, FIG. 10 is a process flow chart 1000 showing a method of providing power for a gate driver circuit of a corresponding transistor switch of a converter circuit of a power converter. The method includes selectively coupling a level shifter and gate-drive to one of a first output source potential or a second output source potential, wherein the first output source potential comes from a first voltage node of the converter circuit of the power converter, and the second output source potential comes from a second, different voltage node of the converter circuit of the power converter (Block 1002).

The methods may be used together. For example, the method of FIG. 8 may be used for a first part of an auxiliary circuit, and the method of FIG. 9 may be used for a second part of the auxiliary circuit. As another example, the method of FIG. 10 may be used in conjunction with the method of FIG. 8 and/or the method of FIG. 9.

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, silicon-on-insulator (SOI), and silicon-on-sapphire (SOS). Unless otherwise noted above, embodiments of the invention may be implemented in other transistor technologies such as bipolar, LDMOS, BCD, GaAs HBT, GaN HEMT, GaAs pHEMT and MESFET technologies. However, embodiments of the invention may be particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 50 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or or modules for ease of handling, manufacture, and/or improved performance. In particular, IC embodiments of this invention are often used in modules in which one or more of such ICs are combined with other circuit blocks (e.g., filters, passive components, and possibly additional ICs) into one package. The ICs and/or modules are then typically combined with other components, often on a printed circuit board, to form an end product such as a cellular telephone, laptop computer, or electronic tablet, or to form a higher level module which may be used in a wide variety of products, such as vehicles, test equipment, medical devices, etc. Through various configurations of modules and assemblies, such ICs typically enable a mode of communication, often wireless communication.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. An auxiliary circuit configured to provide various voltages and/or signals to a converter circuit controller and/or a converter circuit, the auxiliary circuit including:
   (a) a first terminal configured to be selectably coupled to a first voltage;
   (b) a second terminal configured to be selectably coupled to a second voltage; and
   (c) at least one input voltage selector, wherein a selected input voltage selector of the at least one input voltage selector has a first input coupled to the first terminal, a second input coupled to the second terminal of the auxiliary circuit, and an output, wherein the selected input voltage selector includes (1) a first diode and a first resistor coupled in series between the first terminal and the output, and (2) a second diode and a second resistor coupled in series between the second terminal and the output;
      wherein the selected input voltage selector is configured to (1) selectively couple the greater of the first voltage or the second voltage to provide power to the auxiliary circuit from the output during a startup phase of the auxiliary circuit, and (2) selectively couple the lesser of the first voltage or the second voltage to provide power to the auxiliary circuit from the output during a steady-state operational phase of the auxiliary circuit while the lesser selected voltage meets or exceeds a specified minimum voltage for the steady-state operational phase.

2. The invention of claim 1, wherein the auxiliary circuit includes one or more subcircuits coupled to a corresponding one input voltage selector.

3. The invention of claim 1, wherein at least one input voltage selector is an analog multiplexor.

4. The invention of claim 1, wherein at least one input voltage selector is configured to self-select one of the first voltage or the second voltage to provide power to the auxiliary circuit.

5. The invention of claim 1, wherein at least one input voltage selector is coupled to a control signal that selects one of the first voltage or the second voltage to provide power to the auxiliary circuit.

6. An auxiliary circuit configured to provide various voltages and/or signals to a converter circuit controller and/or a converter circuit, the auxiliary circuit including:
 (a) a first terminal configured to be selectably coupled to a first voltage;
 (b) a second terminal configured to be selectably coupled to a second voltage; and
 (c) at least one input voltage selector, wherein a selected one of the at least one input voltage selector has a first input coupled to the first terminal, a second input coupled to the second terminal of the auxiliary circuit, and an output, wherein at least one input voltage selector includes (1) a first diode coupled in parallel with a first switch, wherein the first diode and the first switch are coupled in series between the first terminal and the output, and (2) a second diode coupled in parallel with a second switch, wherein the second diode and the second switch are coupled in series between the second terminal and the output, wherein the first switch and the second switch are coupled to a control signal that selects one of the first voltage or the second voltage to provide power to the auxiliary circuit;
 wherein the selected input voltage selector is configured to (1) selectively couple the greater of the first voltage or the second voltage to provide power to the auxiliary circuit from the output during a startup phase of the auxiliary circuit, and (2) selectively couple the lesser of the first voltage or the second voltage to provide power to the auxiliary circuit from the output during a steady-state operational phase of the auxiliary circuit while the lesser selected voltage meets or exceeds a specified minimum voltage for the steady-state operational phase.

7. The invention of claim 6, wherein the first diode is an inherent parasitic diode of the first switch, and the second diode is an inherent parasitic diode of the second switch.

8. A power converter including:
 (a) a converter circuit;
 (b) an auxiliary circuit coupled to the converter circuit and configured to provide various voltages and/or signals to the converter circuit, the auxiliary circuit including:
  (a) a first terminal configured to be selectably coupled to a first voltage;
  (b) a second terminal configured to be selectably coupled to a second voltage;
  (c) a first subcircuit having an input coupled to the first terminal and a first output; and
  (d) a second subcircuit having an input coupled to the second terminal and a second output;
  (e) an input voltage selector having a first input coupled to the first output of the first subcircuit, a second input coupled to the second output of the second subcircuit, and a third output, wherein the input voltage selector is configured to (1) select the first subcircuit or the second subcircuit coupled to the greater of the first voltage or the second voltage and provide power from the selected first or second subcircuit to the auxiliary circuit from the third output during a startup phase of the auxiliary circuit, and (2) select the first subcircuit or the second subcircuit coupled to the lesser of the first voltage or the second voltage and to provide power from the selected first or second subcircuit to the auxiliary circuit from the third output during a steady-state operational phase of the auxiliary circuit while the lesser selected voltage meets or exceeds a specified minimum voltage for the steady-state operational phase.

9. The invention of claim 8, wherein the input voltage selector is configured to self-select the first or second subcircuit to provide power from the third output of the auxiliary circuit.

10. The invention of claim 8, wherein the input voltage selector is coupled to a control signal that selects one of the first subcircuit or the second subcircuit to provide power from the third output of the auxiliary circuit.

\* \* \* \* \*